United States Patent
Yin et al.

(10) Patent No.: US 8,861,316 B2
(45) Date of Patent: Oct. 14, 2014

(54) WRITE POLE FOR RECORDING HEAD

(71) Applicant: Seagate Technology LLC, Cupertino, CA (US)

(72) Inventors: Huaqing Yin, Eden Prairie, MN (US); Jianhua Xue, Maple Grove, MN (US); Venkateswara Rao Inturi, Shakopee, MN (US); Mark Thomas Kief, Lakeville, MN (US); Michael C. Kautzky, Eagan, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/718,946

(22) Filed: Dec. 18, 2012

(65) Prior Publication Data

US 2014/0169146 A1 Jun. 19, 2014

(51) Int. Cl.
*G11B 11/00* (2006.01)
*G11B 5/127* (2006.01)

(52) U.S. Cl.
CPC .................................. *G11B 5/1278* (2013.01)
USPC .. 369/13.33; 369/13.17; 360/59; 360/123.12; 427/131; 428/812

(58) Field of Classification Search
USPC .......... 369/13.02, 13.13, 13.14, 13.17, 13.32, 369/13.33; 359/280; 427/127, 128, 131; 428/800, 812
See application file for complete search history.

(56) References Cited

U.S. PATENT DOCUMENTS

| | | | |
|---|---|---|---|
| 7,012,789 B2 | 3/2006 | Ju et al. | |
| 7,128,986 B2 * | 10/2006 | Lamberton et al. | 428/812 |
| 7,564,648 B2 * | 7/2009 | Noma et al. | 360/125.02 |
| 7,688,545 B1 | 3/2010 | Vas'Ko et al. | |
| 8,310,901 B1 * | 11/2012 | Batra et al. | 369/13.33 |
| 8,320,077 B1 * | 11/2012 | Tang et al. | 360/125.12 |
| 2003/0133223 A1 * | 7/2003 | Minor | 360/125 |
| 2006/0078762 A1 * | 4/2006 | Noma et al. | 428/812 |
| 2006/0083950 A1 * | 4/2006 | Noma et al. | 428/812 |
| 2008/0055787 A1 * | 3/2008 | Han et al. | 360/319 |
| 2009/0262636 A1 | 10/2009 | Xue et al. | |
| 2010/0321835 A1 * | 12/2010 | Zhang et al. | 360/319 |
| 2011/0134567 A1 * | 6/2011 | Chen et al. | 360/123.12 |
| 2011/0262774 A1 * | 10/2011 | Pentek et al. | 428/815 |
| 2011/0268991 A1 | 11/2011 | Benakli et al. | |
| 2012/0050915 A1 * | 3/2012 | Hong et al. | 360/123.12 |
| 2012/0057257 A1 * | 3/2012 | Takano et al. | 360/125.12 |
| 2012/0063031 A1 * | 3/2012 | Cazacu et al. | 360/123.01 |
| 2012/0105996 A1 * | 5/2012 | Katine et al. | 360/59 |
| 2012/0125885 A1 * | 5/2012 | Chen et al. | 216/22 |
| 2012/0127612 A1 * | 5/2012 | Shin et al. | 360/123.12 |
| 2012/0236437 A1 * | 9/2012 | Kautzky | 360/235.4 |
| 2012/0295132 A1 * | 11/2012 | Min et al. | 428/812 |

OTHER PUBLICATIONS

Epitaxial growth and magnetic properties of Fe 16N2 films with high saturation magnetic flux density, Komuro et al., May 1, 1990, American Institute of Physics, vol. 67, No. 9, pp. 5126-5130.*

* cited by examiner

*Primary Examiner* — Brenda Bernardi
(74) *Attorney, Agent, or Firm* — HolzerIPLaw, PC

(57) ABSTRACT

A write pole structure disclosed herein includes a write pole, a trailing shield, and a high magnetic moment (HMM) material layer on a surface of the trailing shield facing the write pole.

19 Claims, 6 Drawing Sheets

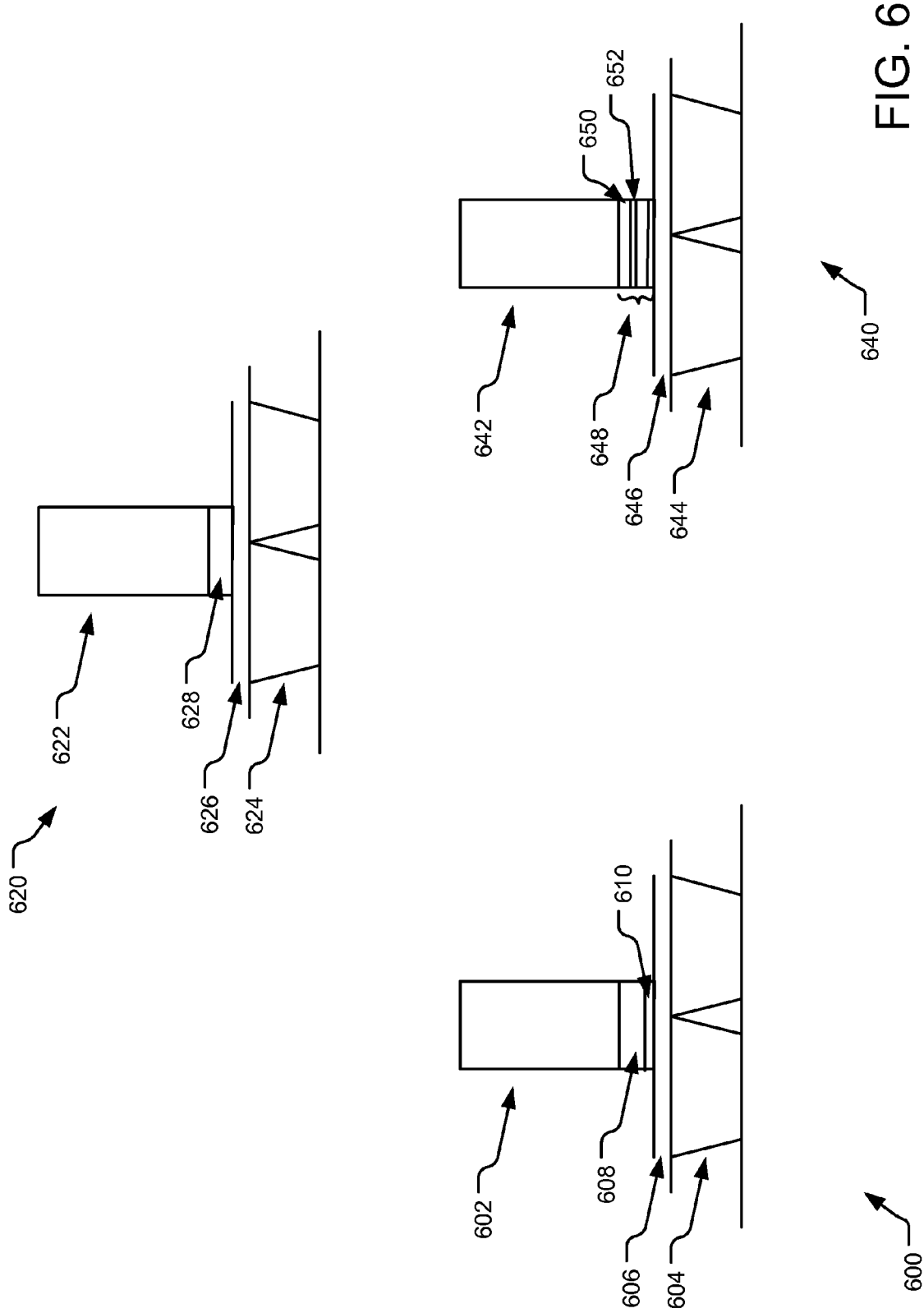

WRITE POLE FOR RECORDING HEAD

BACKGROUND

In a magnetic data storage and retrieval system, a magnetic head typically includes a writer portion for storing magnetically encoded information on a magnetic media and a reader portion for retrieving the magnetically encoded information from the magnetic media. To write data to the magnetic media, an electrical current is caused to flow through a conductive coil to induce a magnetic field in a write pole. By reversing the direction of the current through the coil, the polarity of the data written to the magnetic media is also reversed. The writing performance of the writer pole and the areal density achieved by the writer pole depend upon the magnetic moment generated by the writer pole.

SUMMARY

Implementations described and claimed herein provide a write pole structure disclosed herein includes a write pole, a trailing shield, and a high magnetic moment (HMM) material layer on a surface of the trailing shield facing the write pole.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following detailed description.

BRIEF DESCRIPTIONS OF THE DRAWINGS

FIG. 6 illustrates an example block diagram of alternative write pole structures according to the implementations disclosed herein.

DETAILED DESCRIPTIONS

Figure 1:
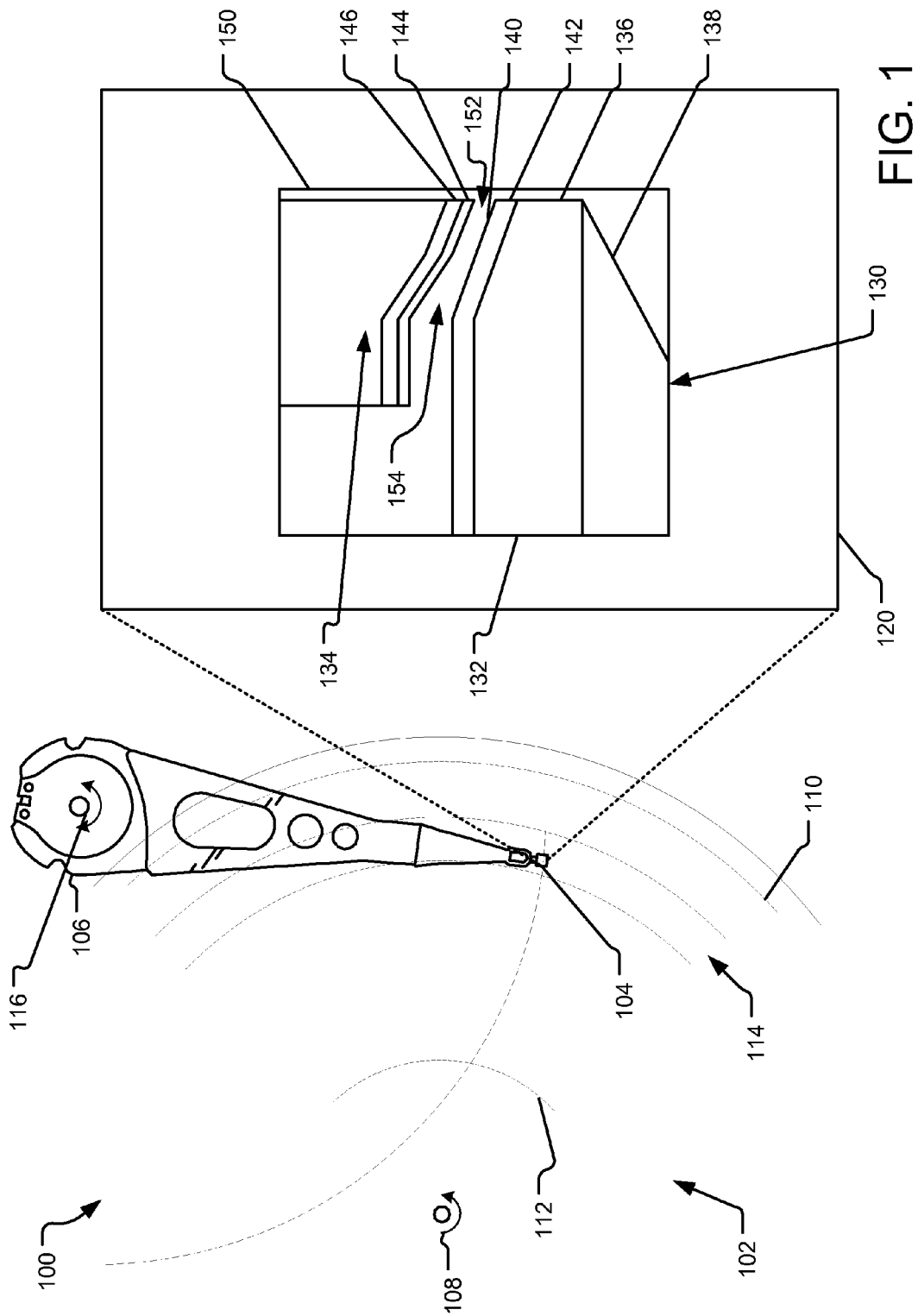
FIG. 1 illustrates a schematic block diagram illustrating an example write pole structure implemented on an end of an actuator assembly.

Perpendicular magnetic recording is used in the recording industry due to the improved super paramagnetics of recording bits in their remnant state. With the further push to increase areal density, recording writers are required to generate large write fields and field gradients in the recording layer of the magnetic media. However, the write field from recording writer's main pole is generally limited by the maximum magnetic moment of the head material and the pole geometry. As the dimensions of the tracks get smaller, the write pole and the trailing edge pole width (TPWT) of the write poles also tend to get smaller. For write poles of small size, the writing performance and writing density of the write pole become increasingly dependent on the magnetic moment of the write pole.

The material used in write poles, such as CoFe alloy, provide magnetic moment in the range of 2.45 tesla. For example, write poles may be made of sputtered CoFe films or plated CoFe films, which are formed of appropriate shape at an air-bearing surface (ABS). Furthermore, such write poles may also include a bevel at the trailing edge of the write pole and a trailing shield separated by a non-magnetic gap from the write pole. Specifically, according to an implementation of the write pole disclosed herein, the beveled edge of the write pole is covered with a film of high magnetic moment (HMM) material. Yet alternatively, an edge of the trailing shield facing the non-magnetic gap is also provided with a layer of HMM material. Such HMM material may include, for example, $Fe_{16}N_2$, DyRh, etc.

To provide such a layer of HMM material on one or more edges of the write pole, an implementation disclosed herein provides a crystalline structure of such HMM material, such as a crystalline structure of the $Fe_{16}N_2$. In a specific implementation of the write pole disclosed herein, the layer of the HMM material has a strict crystalline structure. The HMM material layer may produce magnetic moments substantially higher than 2.45 Tesla. However, such HMM material layer could result in saturation fields as high as 5000 Oersted, resulting in potential of thermal instability of the write pole. An implementation of the write pole disclosed herein provides HMM layers in a manner so as to reduce such thermal instability. For example, an implementation of the write pole includes a frosted HMM layer made of $Fe_{16}N_2$ on top of the trailing edge of a CoFe write pole. In such an implementation, the CoFe material provides magnetic moment of 2.45 Tesla and it also serves as a seed layer for the HMM material ($Fe_{16}N_2$) growth. The resulting bilayer structure of CoFe and $Fe_{16}N_2$ forms an exchange couple structure.

The magnetic moment of the HMM material in such an exchange coupled structure switches coherently in the same direction as that of the CoFe material The thickness of the HMM material may be in the range of several nanometers to hundreds of nanometers. Furthermore, in one implementation, the microstructure of the CoFe layer is changed to meet the needs of the HMM material. Such addition of the HMM material on the trailing edge of the write pole improves the writability and magnetic gradient of the write pole. In an alternative implementation of the write pole disclosed herein, the HMM material is used to replace all CoFe material in the write pole.

FIG. 1 illustrates an example block diagram illustrating an example read sensor structure implemented on an end of an actuator assembly. Specifically, FIG. 1 illustrates a plan view of an implementation of a disc 102 with a transducer head 104 situated on an end of an actuator assembly 106. Disc 102 rotates about a disc axis of rotation 108 during operation. Further, disc 102 includes an outer diameter 110 and inner diameter 112 between which are a number of data tracks 114, illustrated by circular dotted lines. Data tracks 114 are substantially circular and are made up of regularly spaced patterned bits.

Information may be written to and read from the patterned bits on the data tracks 114 through the use of the actuator assembly 106, which rotates during a data track 114 seek operation about an actuator axis of rotation 116 positioned adjacent the disc 102. The transducer head 104 mounted on the actuator assembly 106 at an end distal from the actuator axis of rotation 116 flies in close proximity above the surface of the disc 102 during disc operation. The transducer head 104 includes recording head including a read sensor for reading data from the track 114 and a write pole for writing data to the track 114.

To read data from the magnetic disk 102, transitions on the track 114 of the disk 102 creates magnetic fields. As the read sensor passes over the transitions, the magnetic fields of the transitions modulate the resistance of the read sensor. The change in the resistance of the read sensor is detected by passing a sense current through the read sensor and then measuring the change in voltage across the read sensor. The resulting resistance-based signal is used to recover data encoded on the track of the disk 102. To write data to the magnetic media, an electrical current is caused to flow through a conductive coil to induce a magnetic field in a write pole. By reversing the direction of the current through the coil, the polarity of the data written to the magnetic media is also reversed.

The writing performance of the writer pole and the areal density achieved by the writer pole depend upon the magnetic moment generated by the writer pole. Typically, materials used to construct writer poles provide magnetic moment up to 2.45 Tesla. For example CoFe is widely used material in writer poles wherein the writer poles consist of sputtered CoFe films of plated CoFe films which are formed with appropriate shape at the ABS. Furthermore, the writer poles may also include a bevel at the trailing edge of the pole and a trailing shield separated from the writer pole by a non-magnetic gap.

An implementation of a writer pole disclosed herein includes a high magnetic moment (HMM) material on the trailing edge of the writer pole. For example, a CoFe material providing magnetic moment of up to 2.45 Tesla is used as the seed material for depositing HMM. In such an implementation, the bilayer structure of the CoFe seed layer and the HMM materials forms an exchange coupled structure. Such bilayer structure also allows the HMM material switch in a writer head operating condition. In one implementation, the thickness of the HMM material can be varied from several nanometers to several hundred nanometers.

In an alternative implementation of the writer pole, the microstructure of the CoFe layer is changed to meet the needs of the HMM material. For example, processes such as chuck deposition, seed layer optimization, etc., may be used to change the microstructure of the CoFe layer. The presence of the HMM material on the trailing edge of the writer pole improves the writer poles writability and the magnetic gradient. In an alternative implementation, the HMM material is used to replace all CoFe material in the writer pole, which improves the writability of the writer pole.

FIG. 1 also illustrates an expanded view 120 of a partial cross-sectional configuration of a writer pole structure 130 that is located on the transducer head 104. The writer pole 130 includes a writer pole 132 and a trailing shield 134. The writer pole 132 is shaped to define a write pole tip 136, a leading edge 138, and a trailing edge 140 for the write pole 132. In the implementation disclosed in FIG. 1, the trailing edge 140 includes an HMM layer 142. For example, the HMM layer 142 may be made of material such as DyRh (Dysprosium-Rhodium), etc. The trailing shield 134 further comprises an HMM layer 144 and an HMM seed layer 146. The HMM layer 142 on the writer pole 132 and the HMM layer 144 on the trailing shield 134 increases the magnetic moment of the writer pole structure 130. The writer pole structure 130 defines an air-bearing surface (ABS) 150. When the writer pole structure 130 is mounted on a transducer head, the ABS 150 is separated from a magnetic media by air. The improved magnetic moment at an edge 152 of a gap 154 between the write pole 132 and the trailing shield 134 allows the write pole structure 130 to write data in the magnetic media at higher density level.

Figure 2:
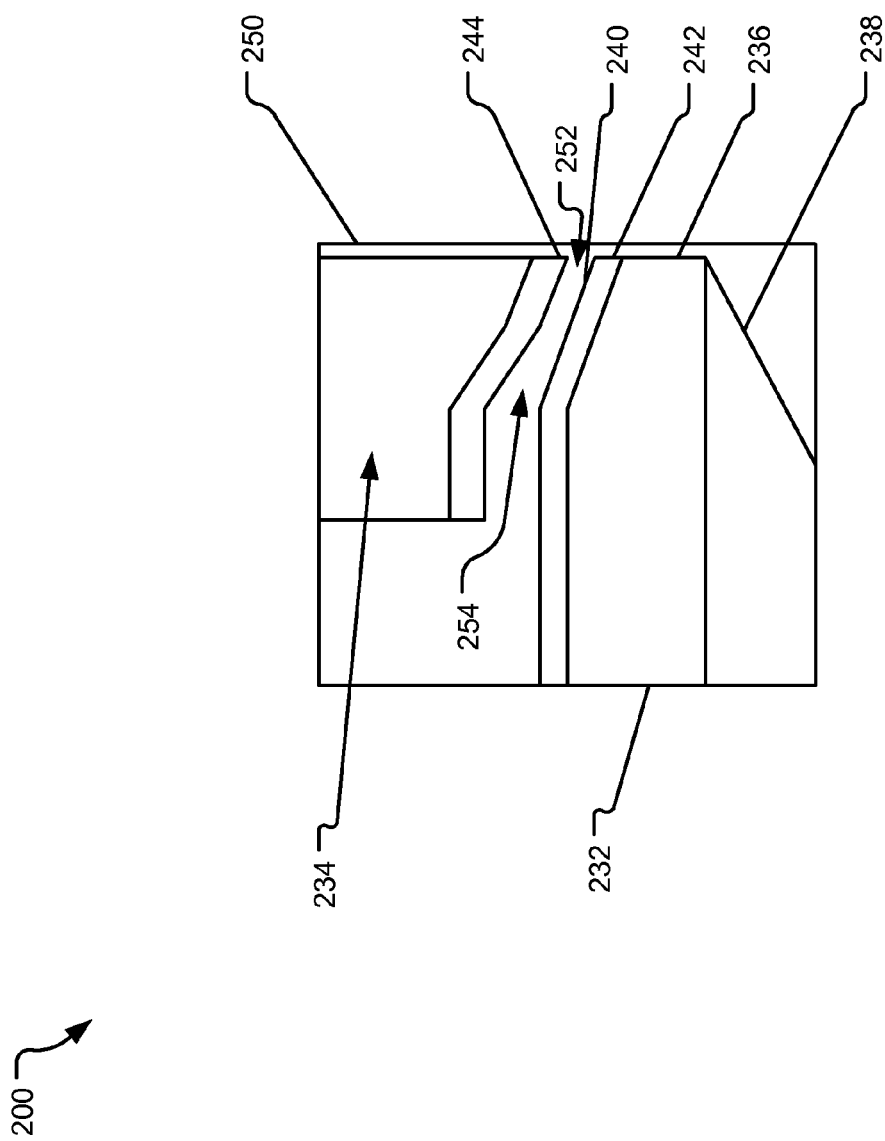
FIG. 2 illustrates an example block diagram of a write pole structure according to the implementations disclosed herein.

FIG. 2 illustrates an example block diagram of a write pole structure 200 according to the implementations disclosed herein. The writer pole 200 includes a writer pole 232 and a trailing shield 234. The writer pole 232 is shaped to define a write pole tip 236, a leading edge 238, and a trailing edge 240 for the write pole 232. In the implementation disclosed in FIG. 2, the trailing edge 240 includes an HMM layer 242. For example, the HMM layer 242 may be made of material such as DyRh, etc.

The trailing shield 234 further comprises an HMM layer 244. The HMM layer 242 on the writer pole 232 and the HMM layer 244 on the trailing shield 234 increases the magnetic moment of the writer pole structure 200. The writer pole structure 200 defines an air-bearing surface (ABS) 250. When the writer pole structure 200 is mounted on a transducer head, the ABS 250 is separated from a magnetic media by air. The improved magnetic moment at an edge 252 of a gap 254 between the write pole 232 and the trailing shield 234 allows the write pole structure 200 to write data in the magnetic media at higher density level.

Figure 3:
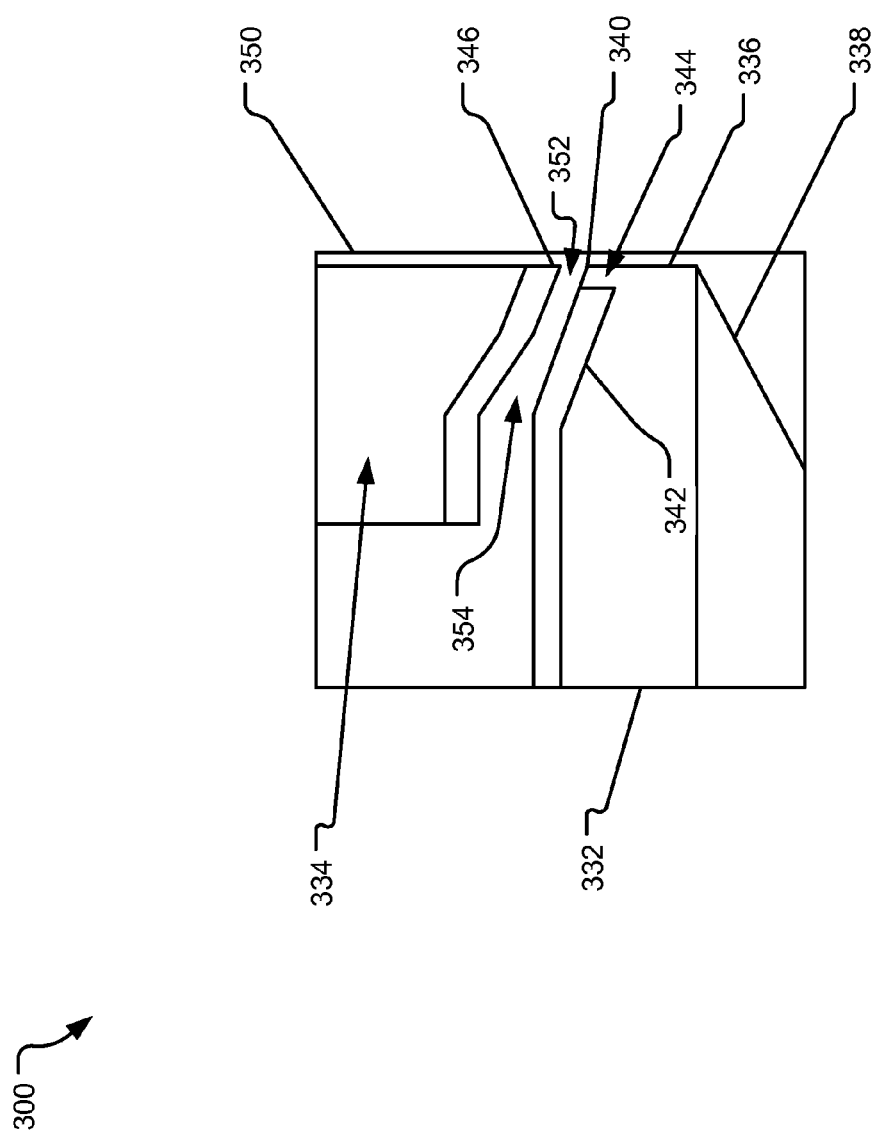
FIG. 3 illustrates an example block diagram of an alternate write pole structure according to the implementations disclosed herein.

FIG. 3 illustrates an example block diagram of an alternate write pole structure 300 according to the implementations disclosed herein. The writer pole 300 includes a writer pole 332 and a trailing shield 334. The writer pole 332 is shaped to define a write pole tip 336, a leading edge 338, and a trailing edge 340 for the write pole 332. In the implementation disclosed in FIG. 3, the trailing edge 340 includes an HMM layer 342. For example, the HMM layer 342 may be made of material such as DyRh, etc. The HMM layer 342 is recessed 344 from the write pole tip 336 and from an air-bearing surface 350.

The trailing shield 334 further comprises an HMM layer 346. The HMM layer 342 on the writer pole 332 and the HMM layer 346 on the trailing shield 334 increases the magnetic moment of the writer pole structure 300. The writer pole structure 300 defines the air-bearing surface (ABS) 350. When the writer pole structure 300 is mounted on a transducer head, the ABS 350 is separated from a magnetic media by air. The improved magnetic moment at an edge 352 of a gap 354 between the write pole 332 and the trailing shield 334 allows the write pole structure 300 to write data in the magnetic media at higher density level.

The recessed 344 HMM layer 342 improves the reliability of the write pole as the HMM material 344 is not exposed to hard disc drive working conditions at the ABS 350. Specifically, the operating conditions of a hard disc drive may result in the edge 352 near the ABS 350 having high temperature and moisture content. Providing the recessed 344 HMM layer 342 shields the HMM layer 342 from such conditions at the ABS 350. In one implementation, the amount of indentation of the recess 344 is between several nanometers to several hundreds of nanometers.

Figure 4:
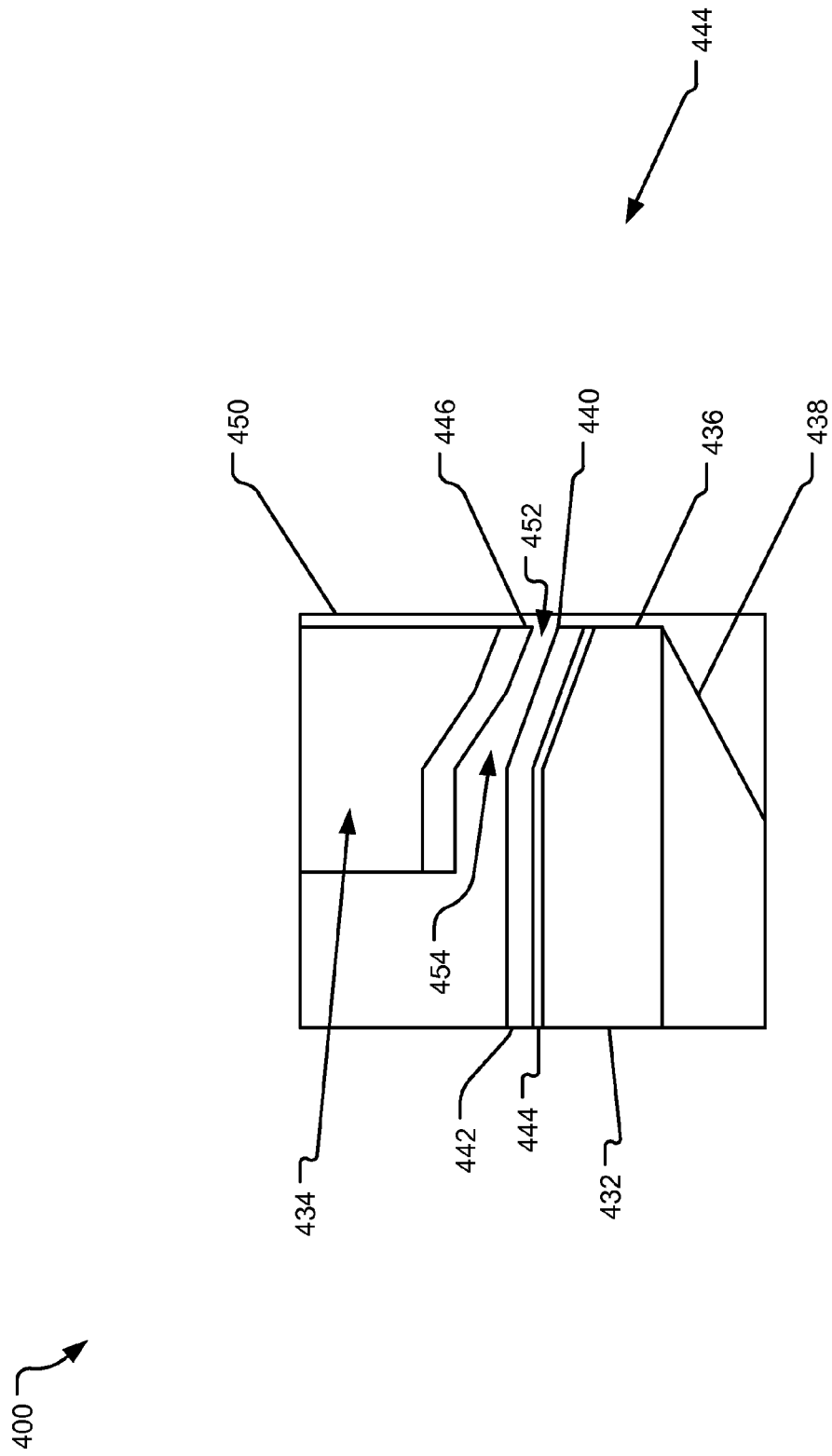
FIG. 4 illustrates an example block diagram of an alternative write pole structure according to the implementations disclosed herein.

FIG. 4 illustrates an example block diagram of a write pole structure 400 according to the implementations disclosed herein. The writer pole 400 includes a writer pole 432 and a trailing shield 434. The writer pole 432 is shaped to define a write pole tip 436, a leading edge 438, and a trailing edge 440 for the write pole 432. In the implementation disclosed in FIG. 4, the trailing edge 440 includes an HMM layer 442. For example, the HMM layer 442 may be made of material such as DyRh, etc. Furthermore, the trailing edge 440 also includes an insert layer 444 underneath the HMM layer 442.

The trailing shield 434 further comprises an HMM layer 446. The HMM layer 442 on the writer pole 432 and the HMM layer 446 on the trailing shield 434 increase the magnetic moment of the writer pole structure 400. The writer pole structure 400 defines an air-bearing surface (ABS) 450. When the writer pole structure 400 is mounted on a transducer head, the ABS 450 is separated from a magnetic media by air. The improved magnetic moment at an edge 452 of a gap 454 between the write pole 432 and the trailing shield 434 allows the write pole structure 400 to write data in the magnetic media at higher density level.

In one implementation, the insert layer 444 on the write pole 432 serves as a seed layer of HMM growth on the CoFe material of the write pole 432. Specifically, the insert layer 444 promotes growth of the HMM layer 442 to have more crystalline structure. The insert layer 444 may be made of metallic material such as Fe or dielectric material such as MgO. Such insert layer 444 material is selected such that it promotes single crystal growth of the HMM layer 442 or a highly oriented growth of the HMM layer 442 at low deposition temperatures. In example implementations, the thickness of the insert layer 444 is in the range of several angstroms to few nanometers.

Figure 5:
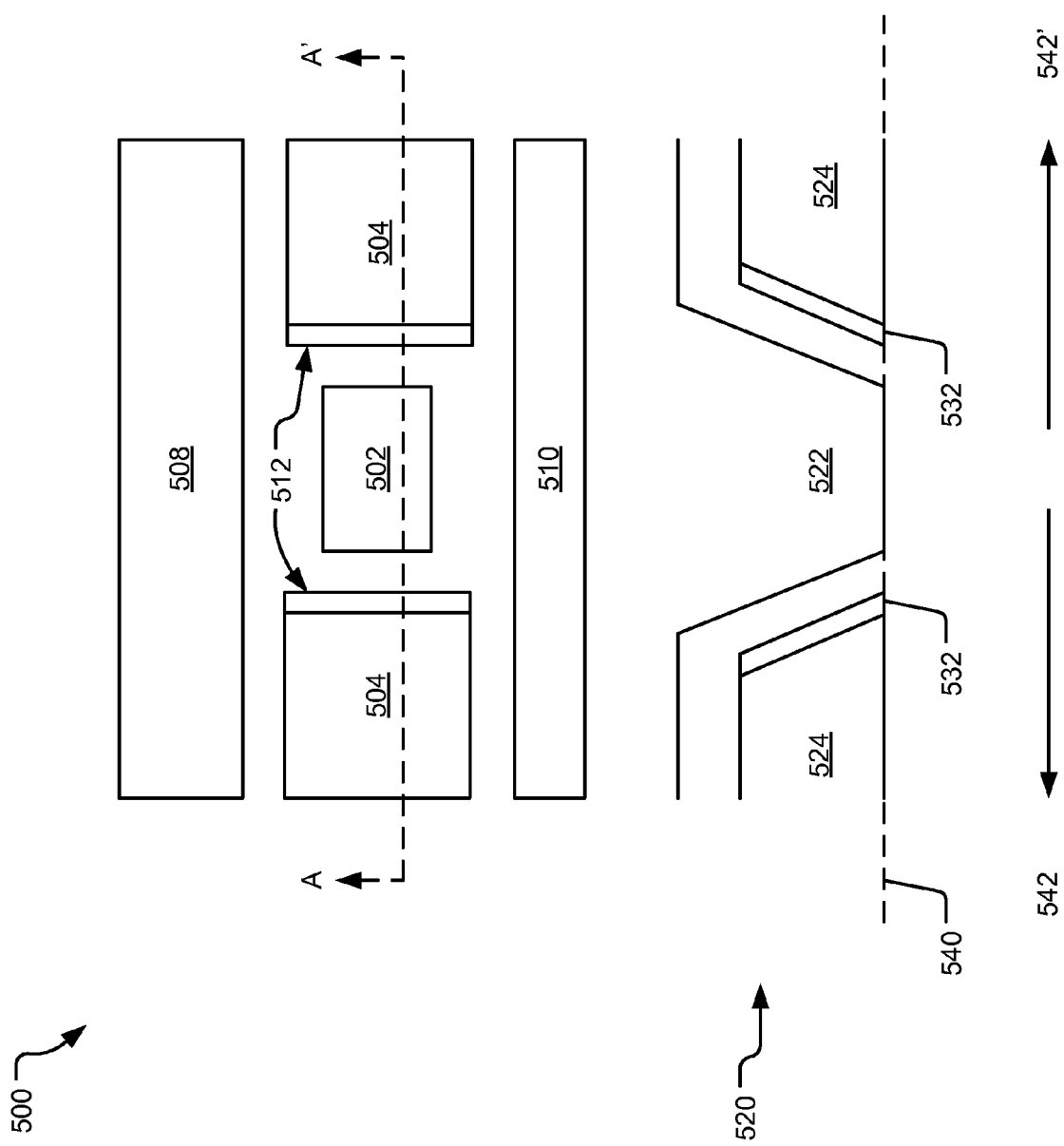
FIG. 5 illustrates an example block diagram of an alternative write pole structure according to the implementations disclosed herein.

FIG. 5 illustrates an example block diagram of an ABS view of an alternative write pole structure 500 according to the implementations disclosed herein. The write pole structure 500 includes a write pole tip 502 that is located between side shields 504. The side shields 504 are located on opposite sides of the write pole tip 502 along a cross-track direction. Furthermore, the write pole structure 500 also includes a trailing shield 508 and a leading shield 510, wherein each of the trailing shield 508 and the leading shield 510 are located on opposite sides of the write pole tip 502 along a direction of movement of the write pole structure 500. As illustrated in FIG. 5, the side shields 504 include a layer 512 of HMM material on the surfaces facing the write pole tip 502. Providing the HMM layer 512 on the side shields promotes the magnetic field gradient along the cross-track direction away from the write pole tip 502. The write pole structure 500 with such reduced magnetic field gradient provides high track-per inch capability (TPIC) to the write pole structure 500 such that the write pole structure 500 may be used for shingled media recording (SMR).

FIG. 5 also illustrates an elevational view 520 of the write pole structure 500 along AA'. The elevational view 520 illustrates the write pole tip 522 with the side shields 524 on opposite sides of the write pole tip along a cross-track direction. The elevational view 520 is illustrated in view of ABS 540. Each of the side shields 524 has an HMM material layer 532 on a surface facing the write pole tip 522. The HMM material layer 532 reduces the magnetic field away from the write pole tip 522, thus promoting gradient for the magnetic field in the directions illustrated by 542 and 542'.

FIG. 6 illustrates an example block diagram of alternative write pole structures 600, 620, and 640 according to the implementations disclosed herein. The write pole structure 600, which can be used in heat assisted magnetic recording (HAMR) recording, includes a write pole 602 next to a bowtie shaped near field transducer (NFT) 604. The write pole 602 is separated from the NFT 604 by a NFT to pole (NPS) spacing layer 606. The write pole structure 600 also includes an HMM layer 608 that is added to the leading edge of the write pole 602. The HMM layer 608 increases the write field and the gradient of the write field at the leading edge of the write pole 602. The write pole structure 600 has the HMM layer 608 deposited on the NPS layer 606 using a thin seed layer 610, which promotes the growth of the HMM layer 608 on top of the NPS layer 606. For example, the HMM layer 608 may be made of 5-20 nm of $Fe_{16}N_2$. IN such an implementation, the seed layer 610 may be made of 1-5 nm of a material having a low-misfit lattice match with Fe16N2 and having robust inter-diffusion and chemical corrosion resistance properties. Such seed layer 610 protects the HMM layer 608 from the high temperature, high pressure, and high humidity environment resulting from HAMR using the NFT 604. Examples of such seed layer 610 material, include without limitation, MgO, $Y_2O_3$, BeO, Fe, Ag, Cr, ZrN, etc.

The write pole structure 620, which can also be used in HAMR recording, includes a write pole 622, an NFT 624, an NPS spacer layer 626, and an HMM layer 628. In the write pole structure 620, the HMM layer 628 is grown directly on the NPS spacer layer 626. In such an implementation, the NPS spacer layer 626 is selected from materials having a low-misfit lattice match with Fe16N2, robust inter-diffusion and chemical corrosion resistance properties, and an optical index such that the material does not interfere with the operation of NFT 614. Examples of such material for the NPS spacer layer 626 include, without limitation, Y2O3, BeO, MgO, etc.

The write pole structure 640, which can also be used in HAMR recording, includes a write pole 642, an NFT 644, an NPS spacer layer 646, and a multilayer 648 at the leading edge of the write pole 642. The multilayer 848 is made of alternate layers of HMM layer 650 and seed layer 652. While the implementation of the write pole structure 640 only includes two layers of HMM layer and seed layer, in alternative implementations, higher number of such HMM layer and seed layer may be provided. In an example implementation, each of the HMM layers in the multilayer 648 may have a thickness of 5-20 nm.

The above specification, examples, and data provide a complete description of the structure and use of example implementations of the invention. Since many implementations of the invention can be made without departing from the spirit and scope of the invention, the invention resides in the claims hereinafter appended. Furthermore, structural features of the different implementations may be combined in yet another implementation without departing from the recited claims. The implementations described above and other implementations are within the scope of the following claims.

What is claimed is:

1. A write pole structure comprising:
   a write pole;
   a trailing shield; and
   a high magnetic moment (HMM) material layer on a surface of the trailing shield facing the write pole, wherein the HMM layer comprises a multilayer structure, each layer of the multilayer structure comprising an HMM layer and a seed layer.

2. The write pole structure of claim 1, further comprising a seed layer between the HMM layer and the surface of the trailing shield.

3. The write pole structure of claim 1, wherein the HMM is $Fe_{16}N_2$.

4. The write pole structure of claim 1, wherein the second HMM layer is recessed from a tip of the write pole near an air-bearing surface (ABS).

5. An apparatus comprising:
   a write pole;
   a near field transducer (NFT) separated from the write pole by an NFT to pole spacer (NPS) layer; and
   a high magnetic moment (HMM) layer between the write pole and the NPS layer, wherein the HMM layer comprises a multilayer structure, each layer of the multilayer structure comprising an HMM layer and a seed layer.

6. The apparatus of claim 5 wherein the HMM layer is $Fe_{16}N_2$.

7. The apparatus of claim 5 further comprising a seed layer between the NPS layer and the HMM layer.

8. The apparatus of claim 5 wherein the seed layer is made of at least one of MgO, $Y_2O_3$, BeO, Fe, Ag, Cr, and ZrN.

9. The apparatus of claim 5 wherein the HMM layer has a thickness between 5 nm and 20 nm.

10. A magnetic recording head comprising:
a write pole structure having high magnetic moment (HMM) material having magnetic moment higher than 2.45 Tesla, wherein the HMM layer comprises a multilayer structure with each layer of the multilayer structure comprising an HMM layer and a seed layer.

11. The magnetic recording head of claim 10 wherein the HMM material is $Fe_{16}N_2$.

12. The magnetic recording head of claim 10 wherein the HMM material is on a trailing shield of the write pole structure.

13. The magnetic recording head of claim 12 further comprising a seed layer between the trailing shield and the HMM material.

14. The magnetic recording head of claim 13 wherein the seed layer material is at least one of a metallic layer and a dielectric layer.

15. The magnetic recording head of claim 10 wherein the HMM material is recessed from a tip of the write pole adjacent to an air-bearing surface (ABS).

16. The magnetic recording head of claim 10 further comprising a seed layer between trailing edge of the write pole and the HMM material.

17. The magnetic recording head of claim 10 wherein the HMM material is on a side shield of the write pole structure.

18. The write pole structure of claim 1, further comprising a second HMM layer on a surface of the write pole facing the trailing shield.

19. The magnetic recording head of claim 10 wherein the HMM material is on a trailing edge of the write pole.

* * * * *